L. M. LANCASTER.
COMBINED COMPRESSION COCK AND DRAIN.
APPLICATION FILED MAR. 2, 1914.
1,133,566. Patented Mar. 30, 1915.
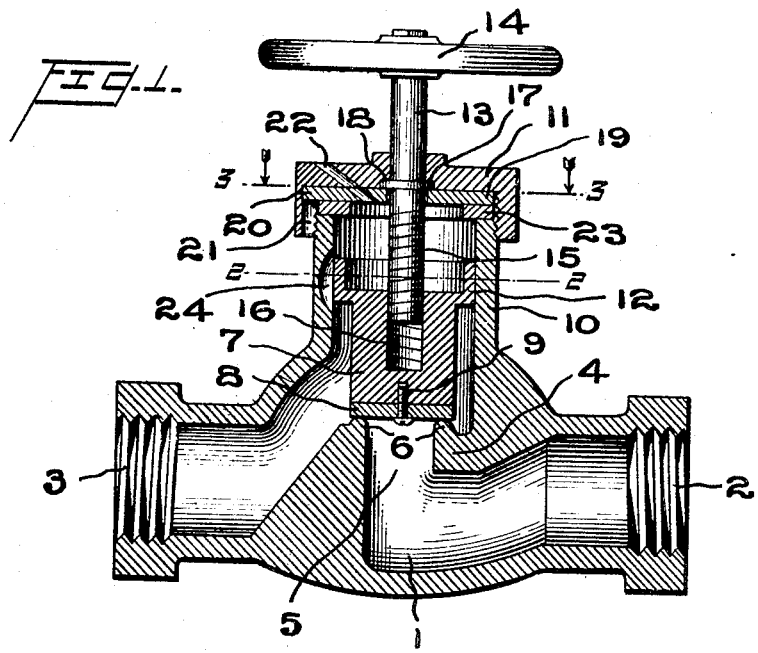
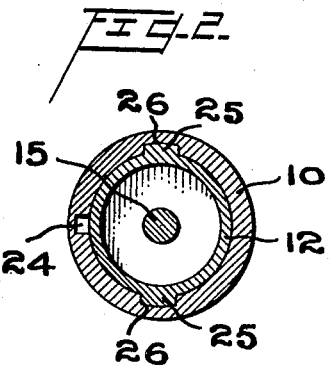
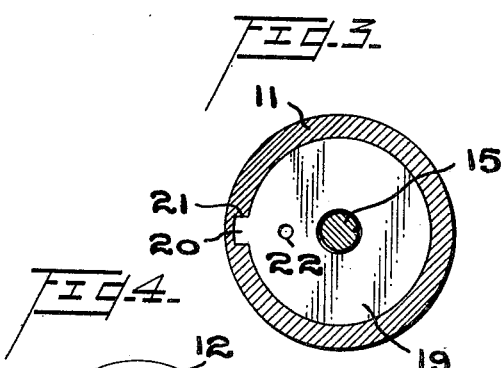
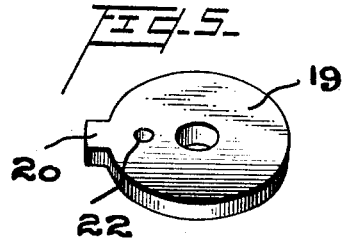
Inventor
Lewis M. Lancaster
By Joshua R. H. Potts
Attorney
Witnesses
L. P. Moyer
C. R. Ziegler

UNITED STATES PATENT OFFICE.

LEWIS M. LANCASTER, OF PHILADELPHIA, PENNSYLVANIA.

COMBINED COMPRESSION COCK AND DRAIN.

1,133,566. Specification of Letters Patent. Patented Mar. 30, 1915.

Application filed March 2, 1914. Serial No. 821,988.

*To all whom it may concern:*

Be it known that I, LEWIS M. LANCASTER, a citizen of the United States, residing at Philadelphia, in the county of Philadelphia and State of Pennsylvania, have invented certain new and useful Improvements in Combined Compression Cocks and Drains, of which the following is a specification.

My invention relates to improvements in combined compression cocks and drains, the object of the invention being to provide a compression cock which when in closed position permits the fluid to drain past the valve through a suitable outlet, and when in open position closes the drain so as to prevent the escape of fluid through the outlet when the valve is in substantially anything but a closed position.

A further object is to provide a cock of the character stated which embodies in its construction, simplicity, strength, durability as well as neatness and attractive appearance, and which can be manufactured and sold at a reasonably low price.

With these and other objects in view, the invention consists in certain novel features of construction and combinations and arrangements of parts as will be more fully hereinafter described and pointed out in the claims.

In the accompanying drawings: Figure 1 is a view in longitudinal section illustrating my improvements. Fig. 2 is a view in cross section on the line 2—2 of Fig. 1. Fig. 3 is a view in cross section on the line 3—3 of Fig. 1. Fig. 4 is a perspective view of the valve, and Fig. 5 is a perspective view of the disk 19.

1 represents the body of the cock having an inlet 2 and an outlet 3 with a partition 4 separating said inlet and outlet and having an opening 5 therethrough for the flow of fluid. Around the opening 5, a raised seat 6 is provided for my improved valve 7, the latter preferably having a removable disk 8 secured to its inner end by a screw 9, so that said disk may be replaced when desired. The valve 7 is movable longitudinally through a cylindrical valve case 10 integral with body 1 and closed at its outer end by a cap 11 internally screw-threaded and engaging external screw-threads on the end of valve case 10. The valve 7 at its upper end is provided with an integral piston 12 which snugly fits within the valve case and slides longitudinally in the valve case when the valve is operated.

13 represents a valve stem having an end wheel 14 at its outer end, and at its inner end screw-threaded as shown at 15 engaging threads in a socket 16 in the valve. The stem 13 is held against longitudinal movement by means of an annular enlargement 17 integral with the stem, and held in a pocket 18 in the cap 11 by means of a perforated disk 19. This disk 19 is provided with a lug 20 which engages in a groove 21 in the inner face of cap 11 to hold the disk against rotary movement, and said disk and cap are provided with registering openings 22 through which the fluid may drain as will be explained, said openings being at an angle to deflect the fluid away from the handle.

Between the disk 19 and the end of valve case 10, a ring 23 is securely clamped and this ring is of an internal diameter to project inside of the valve case and against which the piston 12 engages when the valve is in its extreme open position to form an absolutely tight joint.

In the inner face of the valve case 10, a relatively small by-pass 24 is provided and is of a length greater than the length of the piston 12, so that when the valve 7 is in its closed position, fluid from the outlet 3 can by-pass around the piston and escape through the openings 22. This by-pass is relatively short, so that almost as soon as the valve begins to open, the piston will cut off the by-pass and the fluid be compelled to flow through the outlet 3.

To prevent the valve from rotary movement, I provide webs 25 on opposite sides of the piston 12, and these webs 25 slide in longitudinal grooves 26 in the inner face of the valve case.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A cock comprising a body having a valve case thereon, a valve in said case adapted to close the passage through the body, said valve smaller in diameter than the valve case and having an integral piston thereon fitting the valve case, said valve case having a by-pass directing fluid around the piston when the valve is in closed position, a cap screwed onto the end of the valve case, a stem projecting through the cap and having threaded engagement with the valve, said stem having an enlargement thereon, a disk located against the inner face of the cap and having means thereon engaging the cap, preventing rotary movement of the disk, said disk confining the enlargement on the stem between the cap and the disk, and said disk and cap having registering openings for the drain of fluid from the valve case, substantially as described.

2. A cock comprising a body having a partition therethrough separating the inlet from the outlet of the body and having an opening therethrough with a valve seat around said opening, said body having an integral cylindrical valve case, a valve smaller than the valve case and normally positioned against the seat, a piston integral with the valve and fitting the valve case, said valve case having a by-pass around the piston when the valve is in closed position, a cap screwed onto the end of the valve case and having an internal groove, a stem projecting through the cap and having threaded engagement with the valve, said stem having an enlargement thereon, a disk located against the inner face of the cap and confining the enlargement against the cap, said disk having a lug located in the groove in the cap, and said disk and cap having registering openings for the drain of fluid from the valve case, substantially as described.

3. A cock comprising a body having a partition therethrough separating the inlet from the outlet of the body and having an opening therethrough with a valve seat around said opening, said body having an integral cylindrical valve case, a valve smaller than the valve case and normally positioned against the seat, a piston integral with the valve and fitting the valve case, said valve case having a by-pass around the piston when the valve is in closed position, a cap screwed onto the end of the valve case and having an internal groove, a stem projecting through the cap and having threaded engagement with the valve, said stem having an enlargement thereon, a disk located against the inner face of the cap and confining the enlargement against the cap, said disk having a lug located in the groove in the cap, and said disk and cap having registering openings for the drain of fluid from the valve case, and a ring clamped against the end of the valve case and against which the piston bears when the valve is in extreme open position, substantially as described.

In testimony whereof I have signed my name to this specification in the presence of two subscribing witnesses.

LEWIS M. LANCASTER.

Witnesses:
M. E. DITTUS,
CHAS. E. POTTS.

Copies of this patent may be obtained for five cents each, by addressing the "Commissioner of Patents, Washington, D. C."